United States Patent Office 3,133,817
Patented May 19, 1964

---

3,133,817
PHOTOGRAPHIC EMULSIONS CONTAINING NEW SENSITIZING DYES
Curt B. Roth, Binghamton, N.Y., assignor to General Aniline & Film Corporation, New York, N.Y., a corporation of Delaware
No Drawing. Filed Apr. 29, 1960, Ser. No. 25,521
6 Claims. (Cl. 96—106)

This invention relates to silver halide emulsions containing sensitizing dyes having a 6-methoxy-5,7-dimethylbenzothiazole nucleus.

5 - methoxy - 2,6 - dimethylbenzothiazole and 2,5-dimethyl-6-ethoxybenzothiazole are known to be intermediates in the preparation of certain cyanine dyes. However, these dyes have no outstanding characteristics and do not distinguish themselves over other sensitizing dyes with similar conventional substituents when used in photographic emulsions.

I have now found that extremely valuable sensitizing dyes may be prepared from benzothiazoles which contain methyl groups in the 2-, 5- and 7-positions and a methoxy group in the 6-position. These bases, which are readily quaternized by conventional methods, can be reacted with cyclammonium quaternary salts containing a reactive group on the α-carbon to produce, inter alia, mono- and poly-methine cyanine dyes which are extremely powerful sensitizers for silver halide emulsions.

Among the objects of my invention are silver halide emulsions containing a 6-methoxy-5,7-dimethylbenzothiazole nucleus. Other objects will be apparent from the following description.

The 6-methoxy-2,5,7-trimethylbenzothiazole which is used as the starting material has the following structure:

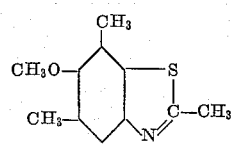

This compound is prepared by nitrating 2,6-dimethylanisol, reducing the resultant nitro compound to form the 4-amino-2,6-dimethylanisol and acetylating the latter to form the 4-acetanilido-2,6-dimethylanisol which has the following formula:

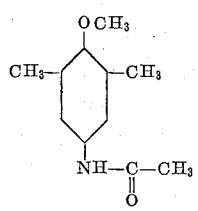

Heating of the acetanilide with phosphorous pentasulfide results in the formation of the thioacetanilide having the following formula:

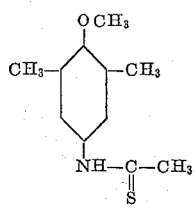

Ring closure and conversion of the 4-methoxy-3,5-dimethylthioacetanilide into the 6-methoxy-2,5,7-trimethylbenzothiazole are accomplished through oxidation with a suitable oxidizing agent such as an alkali metal ferricyanide, i.e., potassium or sodium ferricyanide in the presence of an alkali metal hydroxide, e.g., sodium or potassium hydroxide, bromide, hydrogen peroxide, sodium peroxide, benzoyl peroxide, an alkali metal persulfate, e.g., sodium or potassium persulfate and the like.

The above obtained benzothiazole base may be readily quaternized by conventional methods to produce the desired cyclammonium quaternary salts for the cyanine dye synthesis; for instance, the methoidide or ethiodide is obtained by heating the base with methyl or ethyl iodide under pressure in a sealed container for several hours at 96–105° C. The quaternary salts obtained are characterized by the following general formula:

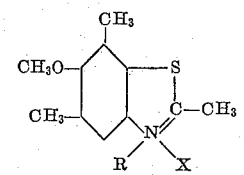

wherein R is an alkyl such as methyl, ethyl, propyl, β-hydroxyethyl, γ-hydroxypropyl, carboxymethyl, carboxyethyl, and the like, aralkyl, e.g., benzyl, phenethyl and the like, and X is an anion such as chloride, bromide, iodide, perchlorate, p-toluene sulfonate, methyl sulfate, ethyl sulfate, and the like.

The above quaternary ammonium salts may be converted to sensitizing dyes characterized by the following general formula:

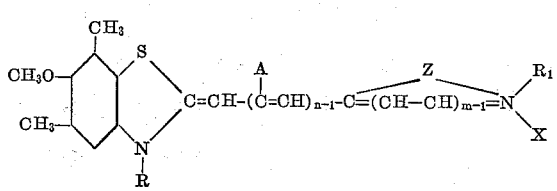

wherein $n$ represents a positive integer of from 1 to 4; $m$ represents a positive integer of from 1 to 2; A represents hydrogen or a lower alkyl group such as methyl, ethyl, and the like; R and $R_1$ are alkyl groups, e.g., methyl, ethyl, propyl, butyl, amyl; hydroxyalkyl groups such as hydroxymethyl, hydroxyethyl, hydroxypropyl and the like; carboxymethyl, carboxyethyl, carboxypropyl; aralkyl, e.g., benzyl phenethyl and the like; X represents an acid radical, e.g., Cl, Br, I, $ClO_4$, $SO_4CH_3$, $SO_4C_2H_5$, $—SO_3C_6H_4CH_3$, and the like, and Z represents the atoms necessary to complete a 5- or 6-membered nitrogenous heterocyclic system of the type used in cyanine dyes, such as pyridine, lepidine, quinoline, indoline, oxazole, thiazoline, thiazole, selenazole, selenazoline, oxazoline, benzothiazole, benzoselenazole, benzoxazole, naphthothiazole, and the like.

These sensitizing dyes are prepared by heating the above benzothiazolium salts in the presence of an acid binding agent such as pyridine, trimethylamine, triethylamine, and the like with a cyclammonium quaternary salt having a reactive grouping on the carbon atom in the 2-position of the heterocyclic ring such as a halogen atom, e.g., chorine, bromine or the like; an alkyl mercapto group, e.g., methylmercapto, ethylmercapto and the like; an alkylmercaptovinyl group, i.e., β-methylmercaptovinyl, β-ethylmercaptovinyl and the like; β-alkylmercapto-β-alkylvinyl, e.g., β-methylmercapto-β-methylvinyl, β-ethylmercapto-β-methylvinyl and the like; β-acetanilidovinyl, 4-acetanilido-1,3-butadienyl, and 6-acetanilido-1,3,5-hexatrienyl.

As examples of suitable cyclammonium quaternary cyanine dye salt intermediates having a reactive group in the 2-position to the nitrogen atom thereof so as to form a mono-methine dye, the following may be mentioned:

2-methylmercapto-6-methylquinoline ethiodide
2-methylmercaptopyridine ethiodide
2-methylmercaptothiazoline ethiodide
2-phenylmercaptothiazoline ethiodide, and the like.

In preparing trimethine cyanine dye salts, the following cyclammonium dye salt intermediates having a reactive group in the β-position of the side chain in the 2-position of the nitrogen atom thereof may be employed:

2-(β-acetanilidovinyl)thiazoline ethiodide
2-(β-acetanilidovinyl)benzothiazole ethiodide
2-(β-acetanilidovinyl)benzoxazole ethiodide
2-(β - ethyl-β-methyl-mercaptophenyl)benzoselenazole ethiodide
2-(β-methylmercapto-β-methylvinyl)benzothiazole ethiodide
2-(β-methylmercapto-β-propylvinyl)benzothiazole ethiodide In preparing pentamethine and heptamethine cyanine dyes, the following cyclammonium quaternary salts having a reactive group in the delta- and zeta-positions of the side chain in the 2-position of the nitrogen atom thereof may be employed:

2-(4-acetanilido-1,3-butadienyl)pyridine ethiodide
2-(4-acetanilido-1,3-butadienyl)benzoxazole ethiodide
2-(4-anilino-3-methyl-1,3-butadienyl)pyridine ethiodide
2-(4-anilino-3-methyl-1,3-butadienyl)-β-naphthoxazole ethiodide
2-(4-anilino-3-ethyl-1,3-butadienyl-α-naphthothiazole ethiodide
2-(6-anilino-1,3,5-hexatrianyl)thiazoline ethiodide
2-(6-anilino-1,3,5-hexatrienyl)-α-naphthothiazole ethiodide
2-(6-anilino-1,3,5-hexatrienyl)-β-naphthothiazole ethiodide
2-(6-anilino-1,3,5-hexatrienyl)-α-naphthoselenazole ethiodide
2-(6-anilino-1,3,5-hexatrienyl)-β-naphthoselenazole ethiodide
2-(6-anilino-4-methyl-1,3,5-hexatrienyl)thiazoline ethiodide
2-(6-anilino-4-methyl-1,3,5-hexatrienyl)benzothiazole ethiodide
2-(6-anilino-4-butyl-1,3,5-hexatrienyl)benzothiazole ethiodide The new dyes of my invention have been found to be particularly useful since they operate to increase the sensitivity of photographic emulsions to a higher extent than comparable sensitizing dyes without the 6-methoxy-2,5,7-trimethylbenzothiazole nucleus. The sensitizing bands of the new dyes of my invention are unusually sharp so that they render themselves advantageously for use in color emulsions. In addition, my new dyes are not readily displaced from the silver halide grain surface by photographic additives such as color formers and stabilizers. In this way, my new dyes are far superior to previously known dyes. This is of great practical importance because my emulsions do not lose their optical sensitization when used with such additives.

The invention is further illustrated by the following examples although it is to be understood that the invention is not to be restricted thereto.

PREPARATION OF INTERMEDIATES

Example I 2,6-DIMETHYL-4-NITROANISOL

One hundred and fifty-four grams (1.135 moles) of freshly distilled 2,6-dimethyl anisole prepared by reacting 2,6-dimethyl phenol with dimethyl sulfate substantially as described in Berichte, vol 41, page 2339, were dissolved in 313.2 ml. of glacial acetic acid and cooled with ice. A second solution, consisting of 784 ml. of 90% nitric acid in 626 ml. of glacial acetic acid, was cooled to 10° C. and then added dropwise in such a manner that the temperature stayed between 2° and 5° C. After 6 hours the addition was complete. The solution was then allowed to warm up to 9 to 10° and kept for 15 minutes at this temperature. The slurry was then poured onto ice. The product was immediately filtered off and washed until the filtrate was neutral. The light yellow compound was then dried overnight at room temperature. 126.2 grams of the nitro-derivative was obtained, corresponding to a 61.5% yield. The melting point was 99–100°.

Example II

4-AMINO-2,6-DIMETHYLANISOLE

Ninety grams of 2,6-dimethyl-4-nitroanisole dissolved in 150 ml. of methanol was reduced with hydrogen at room temperature and 3.4 atm. pressure, using platinum dioxide ($PtO_2$) as the catalyst. The pressure was released after the theoretical amount of hydrogen had been used up and the solution filtered from the catalyst. The filtrate was acidified with concentrated aqueous hydrochloric acid and the methanol distilled off under reduced pressure. The dry product weighed 77.5 grams. The product was transferred to a separatory funnel with dilute hydrochloric acid and purified by extraction with ether. The aqueous layer was then made alkaline with aqueous sodium hydroxide and the free amine extracted with ether. The ether extract was dried with anhydrous sodium sulfate and the solvent evaporated. The product was distilled under reduced pressure at 95°/1.8 mm or 130°/8 mm. The distilled product crystallized on cooling. Yield 41.6 grams; M.P. 60° C.

An analysis gave the following results:

| $C_9H_{13}ON$ | C | H |
|---|---|---|
| Calculated | 71.49 | 8.67 |
| Found | 71.43 | 8.58 |
| Found | 71.48 | 8.65 |

Example III

4-ACETAMINO-2,6-DIMETHYLANISOLE

Into a solution of 41.3 grams (0.274 mole) of 4-amino-2,6-dimethylanisole in 100 ml. of benzene was dropped a mixture of 28.5 grams of acetic anhydride (0.280 mole) in 50 ml. of benzene over a period of 35 minutes. The solution was then heated to its reflux temperature. The crystals which formed on cooling were filtered off, washed with ether, filtered again and dried. 41.0 grams of a crystalline, snow-white product was obtained which melted sharply at 136.5°. An analysis gave the following results:

| $C_{11}H_{15}O_2N$ | C | H | N |
|---|---|---|---|
| Calculated | 68.37 | 7.82 | 7.25 |
| Found | 68.42 | 7.79 | 7.32 |

Example IV

6-METHOXY-2,5,7-TRIMETHYLBENZOTHIAZOLE

A solution of 41 grams of 2,6-dimethyl-4-acetaminoanisole in a mixture of 19.5 ml. of pyridine and 52.0 ml. of dioxane was placed in a 1-liter, 3-neck flask provided with stirrer and reflux condenser and heated slowly on a steam bath. 26 grams of phosphorous pentasulfide ($P_2S_5$) was added in small portions with the steam turned off before each addition. After all the phosphorous pentasulfide had been added over a period of 30 minutes, heating was continued for one hour with vigorous stirring. The reaction product was then transferred to a mixture of 200 grams of ice, 660 ml. of water and 440 ml. of 6 N aqueous sodium hydroxide. The dark brown solution was stirred for 30 minutes and then filtered after the addition of charcoal. The filtrate was acidified with concentrated aqueous hydrochloric acid (ca. 190 ml.) while using external cooling and vigorous stirring. A brown precipitate appeared after the solution had become slightly acidic. Stirring was continued for another hour with cooling. The precipitate was filtered off, washed several times with distilled water and then dried. The yield of the raw product was 44.3 grams.

The product was purified by treating it first with a solution consisting of 17 ml. of dioxane, 330 ml. of water and 200 ml. of 6 N aqueous sodium hydroxide, and after decantation, with a mixture consisting of 17 ml. of 6 N aqueous sodium hydroxide and 100 ml. of water. Both solutions were combined, charcoal added and the undissolved residue filtered off. The filtrate was placed into a dropping funnel and added in a slow stream to a stirred solution consisting of 200 grams of dipotassium monosodium ferricyanide in 750 ml. of water. After the addition was complete, the mixture was stirred for one hour.

The aqueous phase was now exhaustively extracted with an ether-benzene mixture in a liquid extractor of the Kutscher-Steudel type. The organic solvent extract was dried with anhydrous sodium sulfate. The solvent was evaporated and the product purified by distillation at 174° C. at reduced pressure. The product crystallized upon cooling. 13.1 grams of 6-methoxy-2,5,7-trimethylbenzothiazole was obtained which exhibited a melting point of 48° C.

An analysis gave the following results:

| $C_{11}H_{13}ONS$ | C | H | N |
| --- | --- | --- | --- |
| Calculated | 63.73 | 6.32 | 6.76 |
| Found | 63.85 | 6.29 | 6.93 |

Example V 3-(β-CARBOXYETHYL)-6-METHOXY-2,5,7-TRIMETHYLBENZOTHIAZOLIUM IODIDE

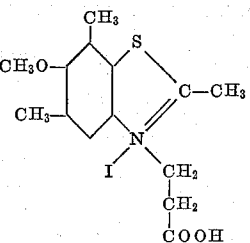

A mixture of 6.50 grams of 2,5,7-trimethyl-6-methoxybenzothiazole, 7.3 grams of freshly recrystallized β-iodopropionic acid and 8 ml. of ether were heated for about 48 hours in a sealed bomb. After cooling, the product was triturated twice with ether. 2.30 grams of a white, crystalline compound was obtained which melted at 192–194° C.

Example VI

3-ETHYL-6-METHOXY-2,5,7-TRIMETHYLBENZOTHIAZOLIUM IODIDE

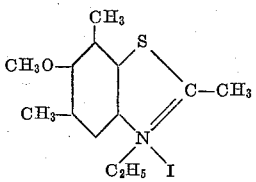

A mixture of 6.50 grams of 6-methoxy-2,5,7-trimethylbenzothiazole, 5.9 grams of ethyl iodide and 5 ml. of ether were placed in bomb, and heated for about 66 hours to 102° C. The resultant product was washed subsequently with isopropanol, acetone and finally with 30 ml. of ether. 1.0 gram of a white crystalline compound was obtained which showed a melting point of 154° C.

DYES AND EMULSIONS

Example VII 3,3',9-TRIETHYL-5',7'-DIMETHYL-6'-METHOXY SELENATHIACARBOCYANINE IODIDE

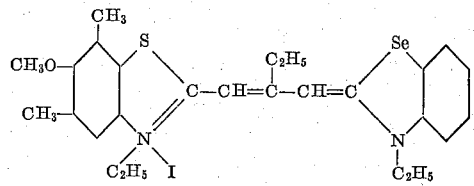

A mixture of 3.26 grams (0.9 millimole) of 3-ethyl-6-methoxy-2,5,7-trimethylbenzothiazolium iodide and 4.22 grams (0.9 millimole) of 2-(β-methylmercapto-β-ethylvinyl)-3-ethyl-5-methoxy benzoselenazolium iodide was dissolved in 30 milliliters of dimethylformamide. After stirring for about 5 minutes, 10 drops of triethylamine were added and the mixture stirred for one hour on the steam bath. After cooling overnight, 400 milliliters of ether was added, the mixture stirred, centrifuged and the solvents decanted. Fifteen ml. of dimethylformamide was then added, the mixture heated on a steam bath and then cooled to room temperature. The mother liquor was decanted and the solid purified by repeated treatment with an acetone-ether mixture, and finally by washing with ether. The product was dried overnight, washed successively with hot isopropanol, ether, chlorobenzene, toluene, xylene and ether. 250 mg. of a product melting point of 251–252° C. was obtained. This dye sensitized a photographic gelatino silver bromoiodide emulsion to about 640 mμ with a maximum sensitivity at about 590 mμ.

Example VIII 3,9-DIETHYL-3'-(β-CARBOXYETHYL)-5',7'-DIMETHYL-5,6'-DIMETHOXYSELENATHIACORBOCYANINE IODIDE

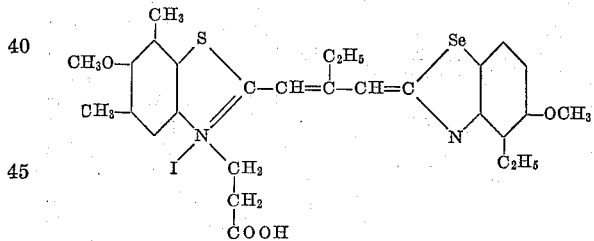

A mixture of 407 mg. (1 millimole) of 3-(β-carboxyethyl)-6-methoxy-2,5,7-trimethyl benzothiazolium iodide, 469 mg. (1 millimole) of 3-ethyl-5-methoxy-2-(β-methylmercapto-β-ethylvinyl)-benzoselenazolium iodide and 3 ml. of dimethylformamide was stirred for about 5 minutes at room temperature. Ten drops of triethylamine were added and the mixture heated with stirring for one hour on a steam bath. The solution was allowed to cool overnight. Sufficient ether was added to bring the total volume to 40 milliliters. The precipitate formed was centrifuged and the solution decanted from the solid. The purification of the precipitate included treatment with hot isopropanol, a mixture of acetone and ether, chlorobenzene, toluene, methanol and ether. This dye sensitized a photographic gelatino silver bromoiodide emulsion to about 640 mμ with maximum sensitivity at about 595 mμ.

Example IX

5'-CHLORO-3,9,3'-TRIETHYL-6-METHOXY-5,7-DIMETHYL THIACARBOCYANINE IODIDE

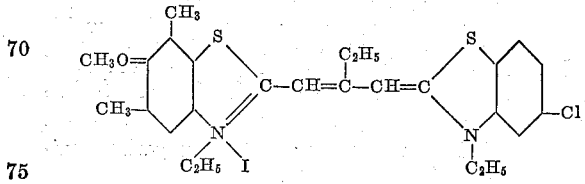

A mixture of 362 mg. (1.0 millimole) of 3-ethyl-6-methoxy-2,5,7-triethylbenzothiazolium iodide, 427 milligrams (1.0 millimole) of 5-chloro-3-ethyl-2-(β-methylmercapto-β-ethylvinyl)-benzothiazolium iodide and 3 ml. of dimethylformamide was stirred for about 5 minutes at room temperature. Ten drops of triethylamine were added, the mixture heated for one hour on the steam bath with stirring and then cooled overnight. The precipitate which had formed was then centrifuged and the mother liquor discarded. 1.5 ml. of dimethylformamide was added, the mixture heated on a steam bath and then diluted with 45 ml. of an acetone-ether mixture. The slurry was centrifuged and the organic solvents decanted. 340 mg. of a dye was obtained which showed a melting point of 282–283° C. This dye sensitized a photographic gelatino-silver bromoiodide emulsion to about 620 mμ with maximum sensitivity at about 595 mμ.

*Example X*

5'-CHLORO-5,7-DIMETHYL-6-METHOXY-9,3'-DIETHYL-3-(β-CARBOXYETHYL)-THIACARBOCYANINE IODIDE

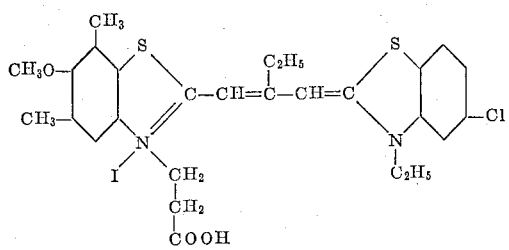

A mixture of 407 mg. (1 millimole) of 3-(β-carboxyethyl)-6-methoxy-2,5,7-trimethylbenzothiazolium iodide, 426 mg. (1 millimole) of 5-chloro-3-ethyl-3-(β-methylmercapto-β-ethylvinyl)-benzothiazolium iodide and 3 ml. of dimethylformamide was stirred for about 5 minutes at room temperature. Ten drops of triethylamine were added and the reaction mixture stirred for one hour on a steam bath. The solution was allowed to cool overnight. A solid precipitated upon the addition of 40 ml. of ether. The dye was purified by trituration with a mixture of acetone and ether. 330 mg. of dye was obtained, having a melting point of 250–252° C. The dye was further purified successively with isopropanol, acetone, chlorobenzene and ether. 230 mg. of a product was obtained which showed a melting point of 258–259° C. This dye sensitized a photographic gelatino silver halide emulsion to about 630 mμ with a maximum sensitivity at about 590 mμ.

*Example XI*

4',5'-BENZO-6-METHOXY-5,7,3'-TRIMETHYL-3,9-DIETHYL THIACARBOCYANINE IODIDE

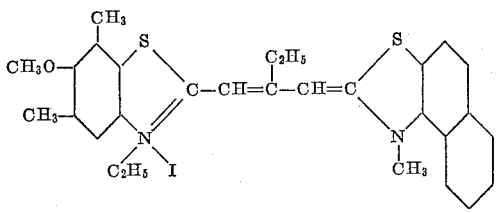

This dye was prepared by reacting 362 mg. (1.0 millimole) of 3-ethyl-6-methoxy-2,5,7-trimethyl-benzothiazolium iodide and 427 mg. (1.0 millimole) of 4,5-benzo-3-methyl-2-(β-methylmercapto-β-ethylvinyl)-benzothiazolium iodide following the procedure described in Example X. 360 mg. of a product was obtained which melted at 180–182° C. The product was further purified by washing with toluene, chlorobenzene and ether. 340 mg. of dye was obtained which had a melting point of 185–186° C. This dye sensitized a photographic gelatino silver halide emulsion to about 660 mμ with maximum sensitivity at about 620 mμ.

*Example XII*

4',5'-BENZO-6-METHOXY-5,7,3'-TRIMETHYL-9-ETHYL-3-(β-CARBOXYETHYL) THIACARBOCYANINE IODIDE

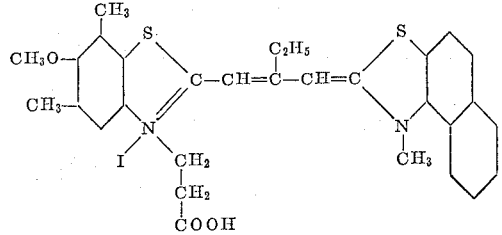

This dye was prepared by reacting 407 mg. (1 millimole) 3 - (β-carboxyethyl)-6-methoxy - 2,5,7 - trimethylbenzothiazolium iodide and 427 mg. (1 millimole) of 4,5-benzo-3-methyl-2-(β-methylmercapto - β - ethylvinyl)-benzothiazolium iodide according to the procedure described in Example X. 510 mg. of a dye was obtained which showed a melting point of 189–190°. This compound was further purified by washing with isopropanol, acetone, ether, toluene, chlorobenzene and again with ether. 450 mg. of dye was obtained which showed a melting point of 195–196°.

This dye sensitized a photographic gelatino silver halide emulsion to about 650 mμ with maximum sensitivity at about 615 mμ.

In the preparation of photographic developing-out emulsions, such as gelatino silver chloride, gelatino silver chlorobromide, gelatino-silver bromoiodide emulsions, and the like, containing the mono- and polymethine dyestuffs of the present invention, it is only necessary to disperse the dyestuffs in the emulsions. It is convenient to add the compounds from solutions in appropriate solvents. An alcohol, such as methanol or ethanol, is satisfactory as a solvent for the dyestuffs. In place of gelatin there can be used synthetic colloids such as hydroxyethyl cellulose or polyvinyl alcohol which serves as colloidal carrier materials.

Emulsions prepared in accordance with this invention can be coated in the usual manner upon any desired support, such as cellulose nitrate, cellulose acetate, polyvinyl acetal resin, glass, paper and the like.

The concentration of these new dyestuffs in the emulsion can vary widely, i.e., from about 1 to about 100 mg. per liter of flowable emulsions. The concentration of the dyestuffs will vary according to the type of light-sensitive material in the emulsion and according to the effect desired. The suitable and most economical concentration for any given emulsion will be apparent to those skilled in the art upon making the ordinary tests and observations customarily used in the art of emulsion making.

While the present invention has been described in considerable detail with respect to certain preferred procedures, materials and uses, it is understood that the new class of cyanine dyes and their uses as sensitizing dyes is not limited thereto, and that numerous variations and modifications may be made. Accordingly, the scope of the invention is to be limited solely by the appended claims.

I claim:

1. A photographic silver halide emulsion containing a sensitizing dye selected from the class having the general formula:

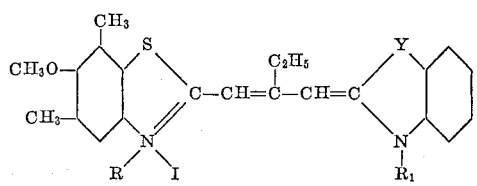

wherein R is a member of the group consisting of lower alkyl and lower carboxyalkyl radicals, R₁ is a member of the group consisting of ethyl and methyl radicals, and Y is a member of the group consisting of sulfur and selenium.

2. A photographic silver halide emulsion containing a sensitizing dye having the following general formula:

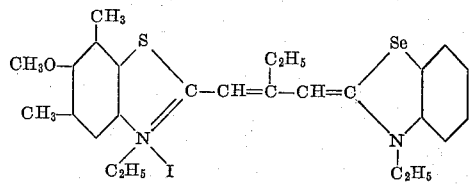

3. A photographic silver halide emulsion containing a sensitizing dye having the following formula:

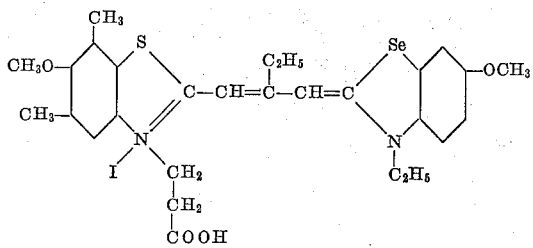

4. A photographic silver halide emulsion containing a sensitizing dye having the following formula:

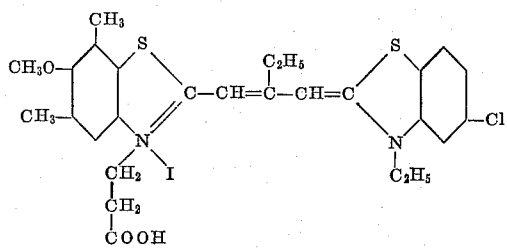

5. A photographic silver halide emulsion containing a sensitizing dye having the following formula:

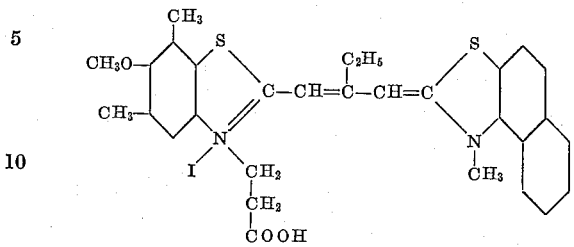

6. A photographic silver halide emulsion containing a sensitizing dye having the following formula:

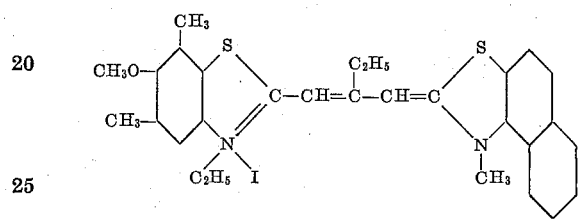

References Cited in the file of this patent
UNITED STATES PATENTS

| | | |
|---|---|---|
| 2,876,231 | Horwitz | Mar. 3, 1959 |
| 2,928,839 | Roth et al. | Mar. 15, 1960 |

FOREIGN PATENTS

| | | |
|---|---|---|
| 219,166 | Switzerland | Jan. 31, 1942 |
| 294,655 | Switzerland | Feb. 1, 1954 |